(12) United States Patent
Guo (10) Patent No.: US 12,114,290 B2
(45) Date of Patent: Oct. 8, 2024

(54) METHOD AND DEVICE FOR DETERMINING CODEBOOK SUBSET, AND USER EQUIPMENT

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 378 days.

(21) Appl. No.: 17/646,291

(22) Filed: Dec. 28, 2021

(65) Prior Publication Data

US 2022/0141803 A1    May 5, 2022

Related U.S. Application Data

(63) Continuation of application No. PCT/CN2020/108987, filed on Aug. 13, 2020.
(Continued)

(51) Int. Cl.
*H04W 72/02*    (2009.01)
*H04L 5/00*    (2006.01)
(Continued)

(52) U.S. Cl.
CPC ........... *H04W 72/02* (2013.01); *H04L 5/0051* (2013.01); *H04W 72/23* (2023.01); *H04W 72/563* (2023.01)

(58) Field of Classification Search
CPC ................. H04W 72/02; H04W 72/23; H04W 72/563; H04W 72/53; H04L 5/0051;
(Continued)

(56) References Cited

U.S. PATENT DOCUMENTS

2018/0183503 A1    6/2018  Rahman
2019/0089432 A1    3/2019  Yang et al.
(Continued)

FOREIGN PATENT DOCUMENTS

CN    107612599 A    1/2018
CN    108111283 A    6/2018
(Continued)

OTHER PUBLICATIONS

First Office Action of the Chinese application No. 202210094236.0, issued on Apr. 13, 2023. 16 pages with English translation.
(Continued)

*Primary Examiner* — Dady Chery
(74) *Attorney, Agent, or Firm* — PERKINS COIE LLP (57) ABSTRACT

Provided is a method and device for determining a codebook subset and a user equipment. In the method, a UE receives first indication information from a network device, the first indication information is used to indicate a first sounding reference signal (SRS) resource in an SRS resource set; the UE receives first configuration information from the network device, the first configuration information is used to configure codebook subsets; and the UE determines a codebook subset for uplink transmission based on the first indication information and the first configuration information.

20 Claims, 4 Drawing Sheets

Related U.S. Application Data (60) Provisional application No. 62/887,296, filed on Aug. 15, 2019.

(51) Int. Cl.
  *H04W 72/23* (2023.01)
  *H04W 72/563* (2023.01)

(58) Field of Classification Search
  CPC .............. H04L 5/0048; H04L 25/03898; H04L 5/0094; H04B 7/0404; H04B 7/0482; H04B 7/0456
  See application file for complete search history.

(56) References Cited

U.S. PATENT DOCUMENTS

| | | | |
|---|---|---|---|
| 2019/0149299 A1 | 5/2019 | Lee et al. | |
| 2019/0349784 A1* | 11/2019 | Tang | ................. H04L 41/08 |
| 2020/0099488 A1 | 3/2020 | Kim et al. | |

FOREIGN PATENT DOCUMENTS

| | | |
|---|---|---|
| CN | 110034886 A | 7/2019 |
| CN | 110535508 A | 12/2019 |
| WO | 2018169375 A1 | 9/2018 |
| WO | 2019057094 A1 | 3/2019 |
| WO | 2019130506 A1 | 7/2019 |

OTHER PUBLICATIONS

3GPP TSG RAN WG1 Meeting AH 1801 R1-1801108, Vancouver, Canada, Jan. 22-26, 2018, Source: Intel Corporation, Title: Text Proposal on Codebook Based UL Transmission, Agenda item: 7.2.1.2, Document for: Discussion. 6 pages.

OPPO: "Text proposals for multi-antenna scheme" 3GPP Draft; R1-1808880, 3rd Generation Partnership Project (3GPP), Mobile Competence Centre ; 650, Route Des Lucioles ; F-06921 Sophia-Antipolis Cedex France; vol. RAN WG1, No. Gothenburg, Sweden; Aug. 20, 2018-Aug. 24, 2018 Aug. 10, 2018 (Aug. 10, 2018), XP051516251, Retrieved from the Internet: URL:http://www.3gpp.org/ftp/tsg%5Fran/WG1%5FRL1/TSGR1%5F94/Docs/R12D1808880%2Ezip [retrieved on Aug. 10, 2018] *paragraph [6.1.1.1] *.

ZTE et al: "Remaining details on codebook based UL transmission", 3GPP Draft; R1-1719527 Remaining Details on Codebook Based UL Transmission, 3rd Generation Partnership Project (3GPP), Mobile Competence Centre ; 650, Route Des Lucioles ; F-06921 Sophia-Antipolis CED; vol. RAN WG1, No. Reno, USA; Nov. 27, 2017-Dec. 1, 2017 Nov. 18, 2017 (Nov. 18, 2017), XP051369341, Retrieved from the Internet: URL:http://www.3gpp.org/ftp/tsg%5Fran/WG1%5FRL1/TSGR1%5F91/Docs/ [retrieved on Nov. 18, 2017].

VIVO: "Feature lead summary on Full TX Power UL transmission", 3GPP Draft; R1-1907671 Summary on MIMO 7 2 84 Full TX Power UL Transmission-V3, 3rd Generation Partnership Project (3GPP), Mobile Competence Centre ; 650, Route Deslucioles ; F-06921 Sophia-Antipol, vol. RAN WG1, No. Reno, USA; May 13, 2019-May 17, 2019 May 16, 2019 (May 16, 2019), pp. 1-20, XP051739959, Retrieved from the Internet: URL: http://www.3gpp.org/ftp/tsg%5Fran/WG1%5FRL1/TSGR1%5F97/Docs/R1%201907671%2Ezip.

Ad-Hoc Chair (Samsung): "Chairman's notes of AI 7.1.2 MIMO", 3GPP Draft; R1-1807785, 3rd Generation Partnership Project (3GPP), Mobile Competence Centre ; 650, Route Des Lucioles ; F-06921 Sophia-Antipolis Cedex France, vol. RAN WG1, No. Busan, Korea; May 21, 2018-May 25, 2018 May 29, 2018 (May 29, 2018), XP051463495, Retrieved from the Internet: URL: http://www.3gpp.org/ftp/tsg%5Fran/WG1%5FRL1/TSGR1%5F93/Docs [retrieved on May 29, 2018] * p. 2 *.

Ericsson Samsung Docomo CATT: "Way Forward on PUSCH Power Scaling in UL Power Control", 3GPP Draft; R1-1807768 WF UL MIMO Power Scaling, 3rd Generation Partnership Project (3GPP) , Mobile Competence Centre; 650, Route Des Lucioles ; F-06921 Sophia-Antipolis Cedex ; FRANCE, vol. RAN WG1, No. Busan, Korea; May 21, 2018-May 25, 2018 May 24, 2018 (May 24, 2018), XP051463387, Retrieved from the Internet: URL:http://www.3gpp.org/ftp/tsg%5Fran/WG1%5FRL1/TSGR1%5F93/Docs [retrieved on May 24, 2018].

Office Action of the Indian application No. 202127061845, issued on Jun. 13, 2022.

Supplementary European Search Report in the European application No. 20852546.9, mailed on Aug. 1, 2022.

International Search Report in the international application No. PCT/CN2020/108987, mailed on Nov. 18, 2020. 3 pages.

Written Opinion of the International Search Authority in the international application No. PCT/CN2020/108987, mailed on Nov. 18, 2020. 3 pages.

3GPP TSG RAN WG1 Meeting #89 R1-1707113, Hangzhou, P.R. China May 15-19, 2017, Source: ZTE, Title: Codebook based UL transmission, Agenda Item:7.1.2.1.3, Document for:Discussion and Decision. 5 pages.

First Office Action of the Singaporean application No. 11202114482W, issued on Feb. 29, 2024. 11 pages.

* cited by examiner

FIG. 1

```
                                                                    201
A UE receives first indication information from a network device, the
first indication information bing used to indicate a first SRS resource in
                       a SRS resource set 202
  The UE receives first configuration information from the network
   device, the first configuration information being used to configure
                         codebook subsets 203
The UE determines a codebook subset for uplink transmission based on
 the first indication information and the first configuration information
```

METHOD AND DEVICE FOR DETERMINING CODEBOOK SUBSET, AND USER EQUIPMENT

CROSS-REFERENCE TO RELATED APPLICATION

This is a continuation of International Application No. PCT/CN2020/108987, filed on Aug. 13, 2020, and entitled "METHOD AND DEVICE FOR DETERMINING CODEBOOK SUBSET, AND USER EQUIPMENT", which claims priority to U.S. Provisional Application No. 62/887,296, filed Aug. 15, 2019, the disclosures of which are hereby incorporated by reference in their entirety.

TECHNICAL FIELD

The disclosure relates to the field of mobile communications, and in particular to a method and device for determining a codebook subset and a user equipment.

BACKGROUND

A current method of determining codebook based physical uplink shared channel (PUSCH) is based on an assumption that the numbers of antenna ports of all SRS resources in an SRS resource set configured for codebook based uplink (UL) transmission are same. However, to support full power transmission, different numbers of antenna ports in different SRS resources in the set will be configured for codebook based UL transmission. Then the configuration of codebook subset would be wrong if the current method is still used. The method for determining a size of TMPI and rank field in downlink control information (DCI) format 0_1 that schedules the codebook based PUSCH is wrong too because the design is based on the assumption of the numbers of antenna ports of different SRS resources in the SRS resource set are same.

SUMMARY

Embodiments of the disclosure provide a method and device for determining a codebook subset and a user equipment.

An embodiment of the disclosure provides a method for determining a codebook subset, including:
  receiving, by a user equipment (UE), first indication information from a network device, wherein the first indication information is used to indicate a first sounding reference signal (SRS) resource in an SRS resource set; and
  receiving, by the UE, first configuration information from the network device, wherein the first configuration information is used to configure codebook subsets; and
  determining, by the UE, a codebook subset for uplink transmission based on the first indication information and the first configuration information.

An embodiment of the disclosure provides a device for determining a codebook subset, including:
  a receiving unit, configured to receive first indication information from a network device and receive first configuration information from the network device, wherein the first indication information is used to indicate a first SRS resource in an SRS resource set; and the first configuration information is used to configure codebook subsets; and
  a determination unit, configured to determine a codebook subset for uplink transmission based on the first indication information and the first configuration information.

An embodiment of the disclosure provides a user equipment. The user equipment includes a processor and a memory. The memory is configured to store a computer program, and the processor is configured to call and run the computer program stored in the memory, to execute the method for determining a codebook subset as described above.

An embodiment of the disclosure provides a chip for implementing the method for determining a codebook subset as described above.

The chip includes a processor, configured to call and run a computer program from a memory, to cause a device with the chip installed thereon to execute the method for determining a codebook subset as described above.

An embodiment of the disclosure provides a computer-readable storage medium for storing a computer program, the computer program causing a computer to perform the method for determining a codebook subset as described above.

An embodiment of the disclosure provides a computer program product. The computer program product includes a computer program which cause a computer to perform the method for determining a codebook subset as described above.

An embodiment of the disclosure provides a computer program, which when executed by a computer, cause the computer to perform the method for determining a codebook subset as described above.

BRIEF DESCRIPTION OF DRAWINGS

The drawings described herein are used to provide a further understanding of the present disclosure and constitute a part of the present disclosure. The schematic embodiments of the present disclosure and the descriptions thereof are used to explain the present disclosure and do not constitute an improper limitation on the present disclosure. In the drawings.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fail within the scope of protection of the present disclosure.

The technical solutions of the embodiments of the present disclosure may be applied to various communication systems, for example, an Long Term Evolution (LTE) system, an LTE Frequency Division Duplex (FDD) system, a LTE Time Division Duplex (TDD) system, a 5G communication system or a future communication system.

Figure 1:
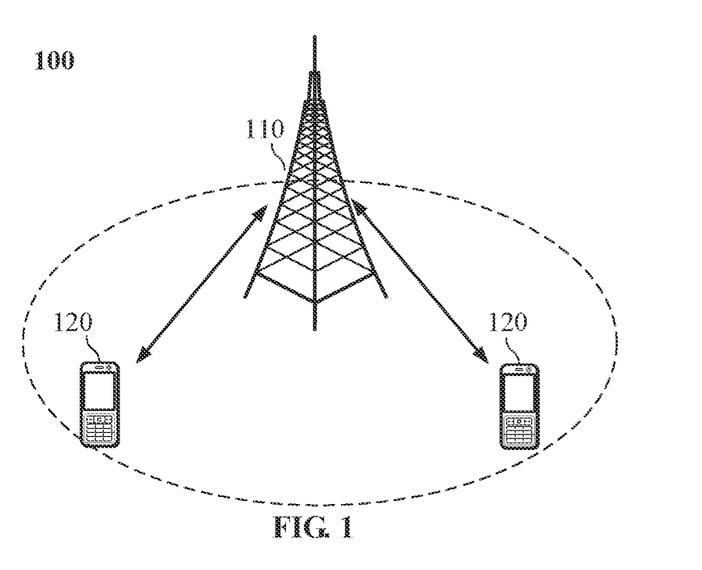
FIG. 1 is a schematic diagram of a communication system architecture according to an embodiment of the present application.

FIG. 1 illustrates a wireless communication system 100 to which the embodiments of the present disclosure are applied. The communication system 100 may include a network device 110. The network device 110 may be a device that communicates with a terminal device 120 (or a communication terminal or terminal). The network device 110 may provide communication coverage for a specific geographic area, and may communicate with terminals located within the coverage area. The network device 110 may be Evolutional Node B (eNB or eNodeB) in the LTE system or a wireless controller in a Cloud Radio Access Network (CRAN). Alternatively, the network device may be a mobile switching center, a relay station, an access point, an in-vehicle device, a wearable device, a hub, a switch, a bridge, a router, a network-side device in a 5G network, or a network device in a future communication system.

The wireless communication system 100 further includes at least one terminal device 120 within the coverage of the access network device 110. The terminal device 120 may be mobile or stationary. Alternatively, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Alternatively, the terminal device 120 may perform Device to Device (D2D) communication.

Alternatively, the 5G system or network may also be called a New Radio (NR) system or network.

A network device and two terminal devices are exemplarily illustrated in FIG. 1. Alternatively, the wireless communication system 100 may include multiple network devices and another number of terminal devices may be included in coverage of each network device. There are no limits made thereto in the embodiments of the present disclosure.

Alternatively, the wireless communication system 100 may further include another network entity such as a network controller and a mobility management entity. There are no limits made thereto in the embodiments of the present disclosure.

It should be understood that the device having a communication function in the network/system in the embodiments of the present application may be called a communication device. Taking the communication system 100 illustrated in FIG. 1 as an example, the communication device may include a network device 110 and a terminal 120 having the communication function, and the network device 110 and the terminal 120 may be specific devices described above, and are not described herein again. The communication device may further include other devices in the communication system 100, such as a network controller, a mobility management entity, and the like, which is not limited in the embodiments of the present application.

It is to be understood that use of terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present application, the technical solutions related to the embodiments of the present application are described below.

As specified in 3GPP release 15, for codebook based PUSCH transmission, the UE can be configured with an SRS resource set with a higher layer parameter usage set to be "codebook". In the SRS resource set, the UE can be configured with one or two SRS resources and those two SRS resources shall have the same number of antenna ports. For codebook based PUSCH transmission, the UE can be configured with a codebook subset through RRC parameter codebookSubset. Codebook based PUSCH transmission can be scheduled by DCI format 0_1. The UE determines its PUSCH transmission precoder based on SRS Resource Indicator (SRI), Transmit Precoding Matrix indicator (TPMI) and the transmission rank, where the SRI, TPMI and the transmission rank are given by DCI fields of SRS resource indicator and Precoding information and number of layers, respectively.

When multiple SRS resources are configured, the TPMI is used to indicate the precoder to be applied over the layers $\{0 \ldots v-1\}$ and that corresponds to the SRS resource selected by the SRI. Or, when a single SRS resource is configured, TPMI is used to indicate the precoder to be applied over the layers $\{0 \ldots v-1\}$ and that corresponds to the SRS resource. The transmission precoder is selected from the uplink codebook that has a number of antenna ports equal to the number of antenna ports in the SRS resources configured for codebook based PUSCH, which is provided by an RRC parameter nrofSRS-Ports in SRS-Config.

For codebook based transmission, the UE determines its codebook subsets based on TPMI and upon reception of higher layer parameter codebookSubset in pusch-Config which may be configured with 'fullyAndPartialAndNonCoherent', or 'partialAndNonCoherent', or 'nonCoherent' depending on the UE capability. The maximum transmission rank may be configured by the higher parameter maxRank in pusch-Config. Particularly, for 4 antenna ports, the codebook subset can be 'fullyAndPartialAndNonCoherent', or 'partialAndNonCoherent' or 'nonCoherent'. However, for 2 antenna ports, the codebook subset configuration can only be 'fullyAndPartialAndNonCoherent' or 'nonCoherent'. A UE shall not expect to be configured with the higher layer parameter codebookSubset set to 'partialAndNonCoherent' when higher layer parameter nrofSRS-Ports in an SRS-ResourceSet with usage set to 'codebook' indicates that two SRS antenna ports are configured.

For codebook based transmission, the UE may be configured with a single SRS-ResourceSet with usage set to 'codebook' and only one SRS resource can be indicated based on the SRI from within the SRS resource set. The maximum number of configured SRS resources for codebook based transmission is 2.

When multiple SRS resources are configured by SRS-ResourceSet with usage set to 'codebook', the UE shall expect that higher layer parameters nrofSRS-Ports in SRS-Resource in SRS-ResourceSet shall be configured with the same value for all these SRS resources.

Table 1 provides precoding information for PUSCH based on the codebook subset configuration.

TABLE 1

Table 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
| --- | --- | --- | --- | --- | --- |
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

The current method of transmitting codebook based PUSCH is based on the assumption that the numbers of antenna ports of all the SRS resources in the SRS resource set configured for codebook based UL transmission are same. However, to support full power transmission, different numbers of antenna ports in different SRS resources in the set will be configured for codebook based UL transmission. Then the configuration of codebook subset would be wrong if use the current method is still used. The method for determining the size of TMPI and rank field in DCI format 0_1 that schedules codebook based PUSCH is wrong too because the design is based on the assumption of the numbers of antenna ports of different SRS resources in that SRS resource set are same.

In embodiments of the present disclosure, the following methods of PUSCH transmission for supporting full power transmission are presented:

In the SRS resource set configured for codebook based PUSCH transmission, one SRS resource with 4 ports and one SRS resource with 2 ports are configured. If the codebook subset configured is "partialAndNonCoher-ent", the UE shall assume the codebook subset of "nonCoherent" is used when SRS resource with 2 antenna ports is indicated for PUSCH transmission.

In PUSCH configuration, the UE, is provided with two higher layer parameters for the configuration of codebook subset: a first configuration for 4 antenna ports and a second configuration for 2 antenna ports. For a given PUSCH transmission, the UE determines the codebook subset according to the indicated SRS resource and corresponding RRC parameter.

In DCI format X scheduling PUSCH transmission, the size of TPMI and rank field depends on the number of antenna ports configured in the SRS resource indicated by the SRI field in the same DCI format X. Here, DCI format X is, for example, DCI format 0_1.

Figure 2:
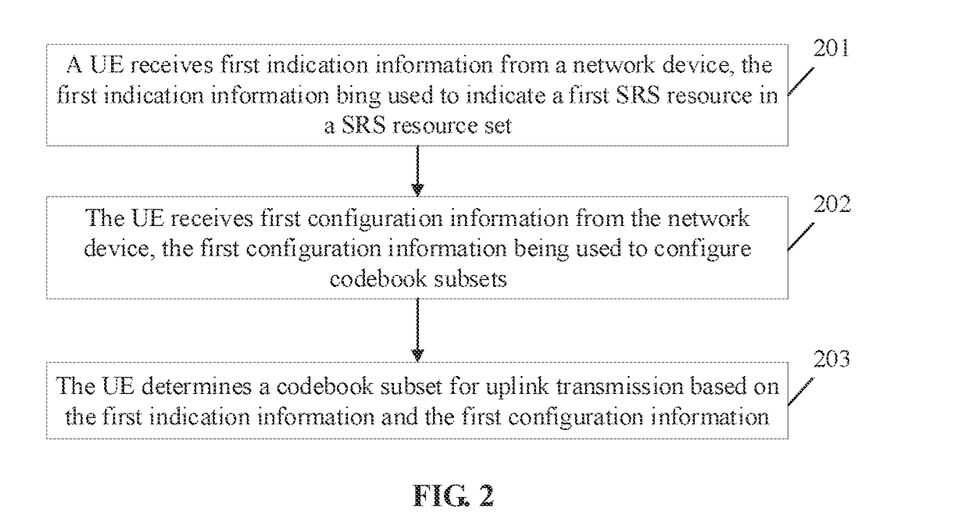
FIG. 2 is a flowchart of a method for determining a codebook subset according to an embodiment of the present application.

The technical solutions of the embodiments of the present application are described in detail below FIG. 2 is a first flowchart of a method for determining a codebook subset according to an embodiment of the present application. As illustrated in FIG. 2, the method for determining a codebook subset includes the following actions illustrated in blocks. The method may start at block 201.

At block 201, the UE receives first indication information from a network device. The first indication information is used to indicate a first SRS resource in an SRS resource set.

In an optional implementation manner of the present application, the UE receives second configuration information from the network device. The second configuration information is used to configure the SRS resource set, and the SRS resource set includes one or more SRS resource. When the SRS resource set includes multiple SRS resources, the numbers of antenna ports of different SRS resources in the multiple SRS resources can be configured to be different or the same.

In an optional implementation manner of the present application, the SRS resource set is configured to support full power transmission.

In an optional embodiment of the present application, the purpose of the SRS resource set is set to a codebook.

In an optional implementation manner of the present application, the first indication information may be SRI. Further, SRI may be carried in DCI.

At block 202, the UE receives first configuration information from the network device. The first configuration information is used to configure a codebook subset.

In an optional implementation manner of the present application, the first configuration information may be carried in higher level signaling (such as RRC signaling). The first configuration information includes one or more configuration parameters. Here, the configuration parameters may also be referred to as higher-level parameters or RRC parameters, and one configuration parameter is used to determine one codebook subset configuration.

At block 203, the UE determines a codebook subset for uplink transmission based on the first indication information and the first configuration information.

Manner 1

The first configuration information includes one configuration parameter, for example, the UE receives the higher layer parameter codebookSubset to provide the codebook subset configuration.

Case 1: the UE determines a first SRS resource in the SRS resource set based on the first indication information and the second configuration information; in a case that the first SRS resource has 2 antenna ports, if the first configuration information is set to partialAndNonCoherent, the UE determines that the codebook subset for uplink transmission is nonCoherent.

Case 2: The UE determines a first SRS resource in the SRS resource set based on the first indication information and the second configuration information; in a case that the first SRS resource has 2 antenna ports, if the first configuration information is set to partialAndNonCoherent, the UE determines that the codebook subset for uplink transmission is fullyAndPartialAndNonCoherent.

In an optional implementation manner, if the maximum number of antenna ports of all SRS resources in the SRS resource set is 2, the UE does not expect the network device to set the first parameter to partialAndNonCoherent.

In an optional implementation manner, the UE sends second indication information to the network device, where the second indication information is used to indicate that the UE supports a codebook subset for uplink transmission when the 2 antenna ports are used for uplink transmission. Further, the second indication information is carried in a capability report of the UE.

Manner 2

The first configuration information includes multiple configuration parameters, and different configuration parameters among the multiple configuration parameters are used to determine codebook subset configurations corresponding to different antenna ports.

In an optional manner, the multiple configuration parameters include a first configuration parameter and a second configuration parameter, where the first configuration parameter is used to determine a first codebook subset configuration corresponding to 4 antenna ports, and the second configuration parameter is used to determine a second codebook subset configuration corresponding to 2 antenna ports.

The UE determines a first SRS resource in the SRS resource set based on the first indication information and the second configuration information. If the first SRS resource has 2 antenna ports, the UE determines the codebook subset for uplink transmission based on the second codebook subset configuration. If the first SRS resource has 4 antenna ports, the UE determines the codebook for uplink transmission based on the first codebook subset configuration.

In the embodiment of the present application, the UE receives DCI. The DCI is used to schedule the uplink transmission. The DCI includes a first bit field and a second bit field. The first bit field is used to carry third indication information. The third indication information is used to indicate information of precoding and transmission rank. The second bit field is used to carry the first indication information. The first indication information is used to indicate the first SRS resource in the SRS resource set.

The size of the first bit field is determined based on at least one of the following:
the value of the second bit field;
the number of ports of the first SRS resource, where the first SRS resource is indicated by first indication information in the second bit field;
target codebook subset configuration, where the target codebook subset configuration is codebook subset configuration corresponding to the number of ports of the first SRS resource.

In the above solution, the first bit field is a TPMI and rank field, and the second bit field is an SRI field.

The above technical solutions of the embodiment of the present application will be described below with specific application examples.

EXAMPLE 1 (Corresponding to Manner 1)

A UE is configured with an SRS resource set for codebook based UL transmission. In the SRS resource set, the UE can be configured with one or more SRS resources. When multiple SRS resources are configured in that set, the SRS resources can be configured with same or different number of antenna ports. In one example, in the SRS resource set, a first SRS resource is configured with 4 antenna ports and a second SRS resource is configured with 2 antenna ports. The UE can be configured with a higher layer parameter to configure the codebook subset. For a codebook based. PUSCH transmission, the UE determines its codebook subset based on the TMPI, SRI and the higher layer parameter configuring codebook subset. If the higher layer parameter for codebook subset is set to be 'partialAndNonCoherent', the UE shall assume the codebook subset used when the second SRS resource is indicated by the SRI is 'nonCoherent'.

Figure 3:
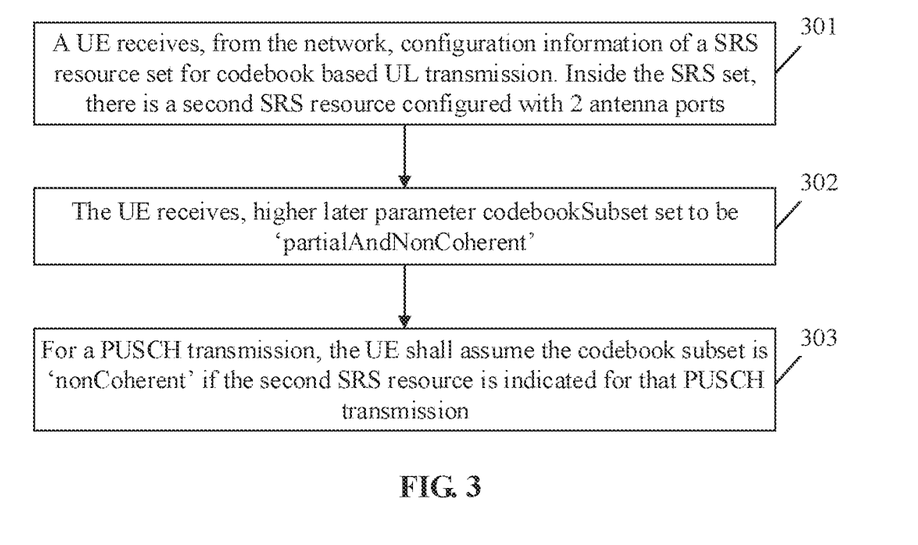
FIG. 3 is a flowchart of a method for determining a codebook subset according to an embodiment of the present application.

As illustrated in FIG. 3, the method for determining a codebook subset in the example may include the following actions illustrated in blocks. The method may start at block 301.

At block 301, a UE receives, from a network device, configuration information of a SRS resource set for codebook based UL transmission. Inside the SRS set, there is a second SRS resource configured with 2 antenna ports.

Here, a UE receives, from the network device, configuration information of a SRS resource set for codebook based UL transmission. The SRS resource set is configured to support full power transmission. In the SRS resource set, the UE is configured with a second SRS resource with 2 antenna ports.

At block 302, the UE receives, higher layer parameter codebookSubset set to be 'partialAndNonCoherent'.

Here, the UE receives the higher layer parameter codebookSubset to provide the codebook subset configuration. The higher layer parameter codebookSubset is set to be 'partialAndNonCoherent'.

At block 303, for PUSCH transmission, the UE shall assume the codebook subset is 'nonCoherent' if the second SRS resource is indicated for that PUSCH transmission.

Here, the UE shall assume the codebook subset used for PUTSCH shall be noncoherent when the second SRS resource is indicated for PUSCH transmission. For a given PUSCH transmission, if the second SRS resource is indicated by the SRI, the UE shall assume the codebook subset is 'nonCoherent'.

According to the technical solutions of the embodiment of the disclosure, the UE can be configured with an SRS resource set with usage set to 'codebook', as configured by the higher layer parameter SRS-ResourceSet. In the SRS resource set with usage set to 'codebook', the UE can be configured with one or more SRS resources. When multiple SRS resources are configured by SRS-ResourceSet with usage set to 'codebook', the UE can expect that higher layer parameters nrofSRS-Ports SRS-Resource SRS-ResourceSet can be configured with the same or different values for all these SRS resources.

In pusch-Config, the UE can be provided with a higher layer parameter codebookSubset which may be configured with 'fullyAndPartialAndNonCoherent', or 'partialAndNonCoherent', or 'nonCoherent' depending on the UE capability. When the maximum value of nrofSRS-Ports in SRS-Resource configured for all SRS resources in SRS-ResourceSet with usage set to 'codebook' is four antenna ports, the UE can be configured with higher layer parameter codebookSubset set to 'fullyAndPartialAndNonCoherent', or 'partialAndNonCoherent', or 'nonCoherent'.

When multiple SRS resources are configured by SRS-ResourceSet with usage set to 'codebook', if the largest value of higher layer parameters nrofSRS-Ports in SRS-Resource in SRS-ResourceSet is four antenna ports and if there is at least one SRS resource configured with two antenna ports in the SRS-ResourceSet with usage set to 'codebook', if higher layer parameter codebookSubset in pusch-Config is configured with 'partialAndNonCoherent', the UE shall assume the codebook subset for the SRS resource(s) configured with two antenna ports in the SRS-ResourceSet with usage set to 'codebook' is 'nonCoherent'.

In another example, when multiple SRS resources are configured by SRS-ResourceSet with usage set to 'codebook', if the largest value of higher layer parameters nrofSRS-Ports in SRS-Resource in SRS-ResourceSet is four antenna ports and if there is at least one SRS resource configured with two antenna ports in the SRS-ResourceSet with usage set to 'codebook', if higher layer parameter codebookSubset in pusch-Config is configured with 'partialAndNonCoherent', the UE shall assume the codebook subset for the SRS resource(s) configured with two antenna ports in the SRS-ResourceSet with usage set to 'codebook' is 'fully AndPartialAndNonCoherent'.

When the largest value of nrofSRS-Ports in SRS-Resource configured for all SRS resources in SRS-ResourceSet with usage set to 'codebook' is two antenna ports, the UE shall not expect to be configured with the higher layer parameter codebookSubset set to 'partialAndNonCoherent'.

In an alternative embodiment of the disclosure, in the UE capability report, the UE can report the support of uplink codebook subset for 2 antenna ports for full power transmission mode. In one example, a UE has four Tx antenna ports. The UE can report parameter pusch-TransCoherence in UE capability reporting to report the support of uplink codebook subset for UL preceding when 4 antenna ports are used. The UE can also report a parameter in UE capability reporting to report support of uplink codebook subset for UL precoding when 2 antenna ports are used for UL transmission. In one example, those 2 antenna ports can be implemented through antenna virtualization by UE implementation.

EXAMPLE 2 (Corresponding to Manner 2)

The UE can be provided with multiple RRC parameters to provide the codebook subset configuration for multiple different number of antenna ports. In one example, the UE can be provided with a codebook subset configuration for four antenna ports and a codebook subset configuration for two antenna ports. The UE can be configured with an SRS resource set for codebook based UE transmission. In the set, the UE can be configured with multiple SRS resources with same or different number of antenna ports. For a given PUSCH transmission, the UE shall determine the codebook subset according the higher layer parameter and the SRS resource indicated by the SRI.

Figure 4:
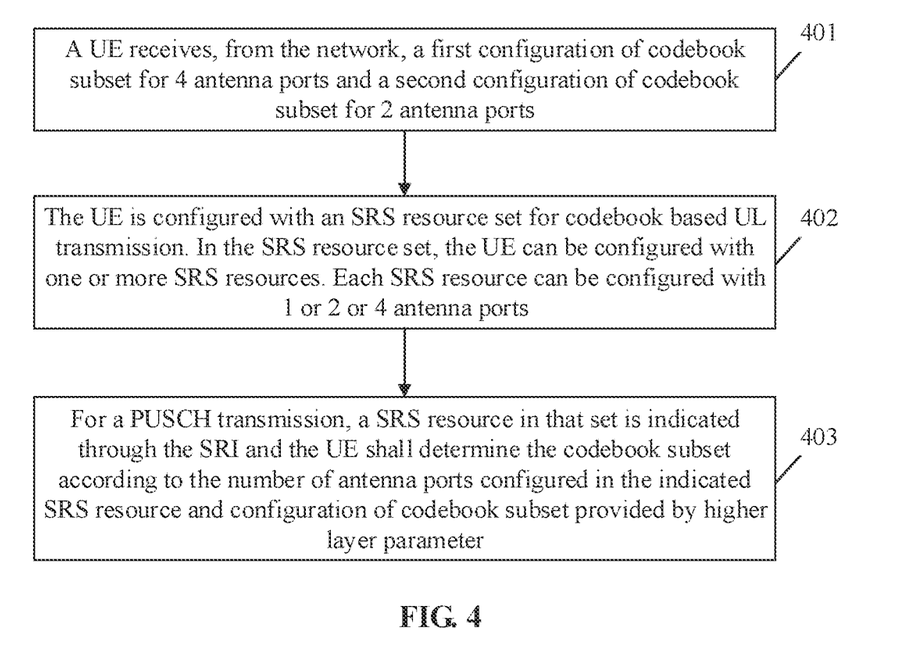
FIG. 4 is a flowchart of a method for determining a codebook subset according to an embodiment of the present application.

As illustrated in FIG. 4, the method for determining a codebook subset in the example may include the following actions illustrated in blocks. The method may start at block 401.

At block 401, a UE receives, from a network device, a first configuration of codebook subset for 4 antenna ports and a second configuration of codebook subset for 2 antenna ports.

Here, a UE can be configured, by the network device, a first configuration of codebook subset for 4 antenna ports and a second configuration of codebook subset for 2 antenna ports.

At block 402, the UE is configured with an SRS resource set for codebook based UL transmission. In the SRS resource set, the UE can be configured with one or more SRS resources. Each SRS resource can be configured with 1 or 2 or 4 antenna ports.

At block 403, for a PUSCH transmission, a SRS resource in that set is indicated through the SRI, and the UE shall determine the codebook subset according to the number of antenna ports configured in the indicated SRS resource and configuration of codebook subset provided by higher layer parameter.

Here, for a given codebook based PUSCH transmission, an SRS resource in that set is indicated through the SRI field in the DCI scheduling the PUSCH transmission. Then the UE shall determine the codebook subset for the PUSCH transmission based on the SRS resource indicated by SRI and configuration of codebook subset provided by higher layer parameter. In one example, if the SRS resource indicated by the SRI is configured with two antenna ports, the UE shall determine the codebook subset according to the second configuration. If the SRS resource indicated by the SRI is configured with four antenna ports, the UE shall determine the codebook subset according to the first configuration.

In one example, a UE can be provided with two higher layer parameters codebookSubset and codebookSubset2port in pusch-Config. The higher layer parameter codebookSubset is used to provide codebook subset configuration for 4 antenna ports and more than 4 antenna ports. The higher layer parameter codebookSubset2port is used to provide codebook subset configuration for 2 antenna ports. A UE can be configured with an SRS resource set with usage set to 'codebook', as configured by the higher layer parameter SRS-ResourceSet. In the SRS resource set with usage set to 'codebook', the UE can be configured with one or more SRS resources. When multiple SRS resources are configured by SRS-ResourceSet with usage set to 'codebook', the UE can expect that higher layer parameters nrofSRS-Ports in SRS-Resource in SRS-ResourceSet can be configured with the same or different values for all these SRS resources. For each SRS resource, the configured nrofSRS-Ports in SRS-Resource can be 1 or 2 or 4.

For codebook based transmission, the UE may be configured with a single SRS-ResourceSet with usage set to 'codebook' and only one SRS resource can be indicated based on the SRI from within the SRS resource set. For a given PUSCH transmission, the UE shall determine its codebook subset based on higher layer parameter codebookSubset2port if the SRS resource indicated by the SRI is configured with 2 antenna ports, and the UE shall determine its codebook subset based on higher layer parameter codebookSubset if the SRS resource indicated by the SRI is configured with 4 antenna ports.

Further, in an alternative embodiment of the disclosure, in a DCI scheduling codebook based PUSCH transmission, the size of bit-field "Precoding information and number of layers" depends on the value of bit-field SRI. The UE shall determine the number of bits in bit-field "Precoding information and number of layers" according to the SRS resource indicated by the SRI in the DCI. The UE can be configured with an SRS resource set for codebook based PUSCH transmission. In the SRS resource set, the UE can be configured with one or more SRS resource. When there are multiple SRS resources, same or different numbers of antenna ports can be configured to different SRS resources. For a codebook based PUSCH transmission, one SRS resource can be indicated by the SRI in the scheduling DCI from within the SRS resource set. Then the UE shall determine the number of bits for "Precoding information and number of layers" according to the number of antenna ports configured in the SRS resource indicated by the SRI and the configuration of codebook subset provided by higher layer parameter for the number of antenna ports as configured in the SRS resource indicated by the SRI.

In one example, DCI format 0_1 is used to schedule PUSCH transmission. The bit-field "SRS resource indicator" (SRI) indicates one SRS resource from the SRS resource set with usage set to 'codebook' and the bit-field "Precoding information and number of layers" indicates the information of PUSCH precoder and transmission rank. The number of bits of bit-field "Precoding information and number of layers" can be determined as follows:

The number of bits of "Precoding information and number of layers" is a function of the value in bit-field SRS resource indicator.

The number of bits of "Precoding information and number of layers" is a function of number of antenna ports configured in the SRS resource indicated by the bit-field SRS resource indicator.

The number of bits of "Precoding information and number of layers" is a function of configuration of codebook subset provided by the higher layer parameter for the number of antenna ports configured in the SRS resource indicated by the bit-field SRS resource indicator.

In one example, if txConfig=codebook, the number of bits is 2 or 4 or 5 if the number of antenna ports in the SRS resource indicated by the 'SRS resource indicator' is 4 according to whether transform precoder is enabled or disabled, and the values of higher layer parameters maxRank, and configuration of codebook subset In one example, if txConfig=codebook, the number of bits is 4 or 5 or 6 if the number of antenna ports in the SRS resource indicated by the 'SRS resource indicator' is 4 according to whether transform precoder is enabled or disabled, and the values of higher layer parameters maxRank, and configuration of codebook subset.

In one example, if txConfig=codebook, the number of bits is 2 or 4 if the number of antenna ports in the SRS resource indicated by the 'SRS resource indicator' is 2 according to whether transform precoder is enabled or disabled, and the values of higher layer parameters maxRank, and configuration of codebook subset In one example, if txConfig=codebook, the number of bits is 1 or 3 if the number of antenna ports in the SRS resource indicated by the 'SRS resource indicator' is 2 according to whether transform precoder is enabled or disabled, and the values of higher layer parameters maxRank, and configuration of codebook subset According to this embodiment, full power transmission based on configuring SRS resources with different number of antenna ports in the SRS resource set for codebook based transmission is supported. For a given codebook based PUSCH transmission scheduled by a DCI format, the UE can determine the right codebook subset for the indicated SRS resource and determine the right size of bit-field TMPI and rank according the indicated SRS resource.

Figure 5:
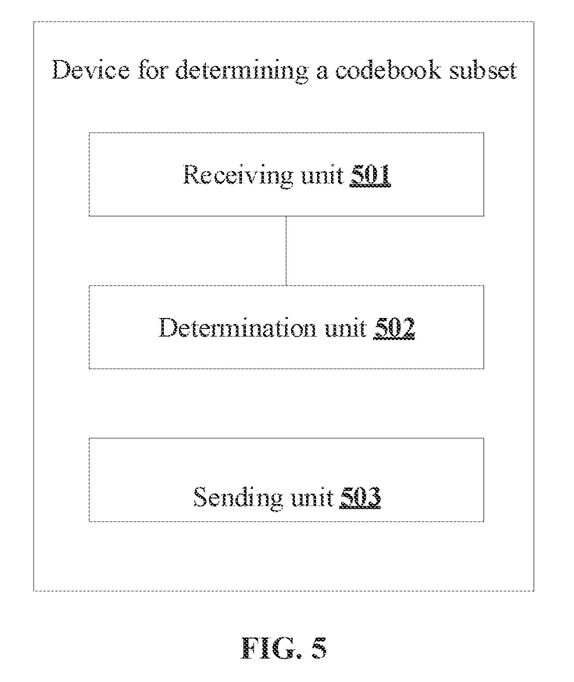
FIG. 5 is a block diagram of a device for determining a codebook subset according to an embodiment of the present application.

FIG. 5 is a block diagram of a device for determining a codebook subset according to an embodiment of the present application. The device for determining a codebook subset is applied to a UE. As illustrated in FIG. 5, the device for determining a codebook subset includes a receiving unit 501 and a determination unit 502.

The receiving unit 501 is configured to receive first indication information from a network device, where the first indication information is used to indicate a first SRS resource in an SRS resource set. The receiving unit 501 is further configured to receive first configuration information from the network device, where the first configuration information is used to configure a codebook subset.

The determination unit 502 is configured to determine a codebook subset for uplink transmission based on the first indication information and the first configuration information.

In an optional implementation of the present application, the receiving unit 501 is further configured to receive second configuration information from a network device. The second configuration information is used to configure the SRS resource set, and the SRS resource set includes one or more SRS resources. In the case that the SRS resource set includes multiple SRS resources, the number of antenna ports of different SRS resources in the multiple SRS resources can be configured to be different or the same.

In an optional implementation of the present application, the SRS resource set is configured to support full power transmission.

In an optional implementation of the present application, usage of the SRS resource set is set to codebook.

In an optional implementation of the present application, the determination unit 502 is configured to determine a first SRS resource in the SRS resource set based on the first indication information and the second configuration information. In the case that the first SRS resource has two antenna ports, if the first configuration information is set to partialAndNonCoherent, the determination unit 502 is configured to determine that the codebook subset for uplink transmission is nonCoherent.

In an optional implementation of the present application, the determination unit 502 is configured to determine a first SRS resource in the SRS resource set based on the first indication information and the second configuration information. In the case that the first SRS resource has two antenna ports, if the first configuration information is set to partialAndNonCoherent, the determination unit 502 is configured to determine that the codebook subset for uplink transmission is fullyAndPartialAndNonCoherent.

In an optional implementation of the present application, if the maximum number of antenna ports of all SRS resource in the SRS resource set is 2, the UE does not expect the network device to set the first parameter to partialAndNonCoherent.

In an optional implementation of the present application, the device further includes a sending unit 503.

The sending unit 503 is configured to send second indication information to the network device, where the second indication information is used to indicate that when the 2-antenna port is used for uplink transmission, the UE supports a codebook subset for uplink transmission.

In an optional implementation of the present application, the second indication information is carried in a capability report of the UE.

In an optional implementation of the present application, the first configuration information includes multiple configuration parameters, and different configuration parameters in the multiple configuration parameters are used to determine codebook subset configurations corresponding to different antenna ports.

In an optional implementation of the present application, the plurality of configuration parameters include a first configuration parameter and a second configuration parameter. The first configuration parameter is used to determine a first codebook subset configuration corresponding to 4 antenna ports. The two configuration parameters are used to determine a second codebook subset configuration corresponding to 2 antenna ports.

In an optional implementation of the present application, the determination unit 502 is configured to determine a first SRS resource in the SRS resource set based on the first indication information and the second configuration information. In the case that the first SRS resource has 2 antenna ports, the determination unit 502 is configured to determine a codebook subset for uplink transmission based on the second codebook subset configuration. In the case that the first SRS resource has 4 antenna ports, the determination unit 502 is configured to determine the codebook subset for uplink transmission based on the first codebook subset configuration.

In an optional implementation of the present application, the receiving unit 501 is further configured to receive DCI, and the DCI is used to schedule the uplink transmission. The DCI includes a first bit field and a second bit field. The first bit field is used to carry third indication information, the third indication information is used to indicate information of preceding and transmission rank, the second bit field is used to carry the first indication information, and the first indication information is used to indicate the first SRS resource in the SRS resource set.

The size of the first bit field is determined based on at least one of the following:

the value of the second bit field;
the number of ports of the first SRS resource, where the first SRS resource is indicated by first indication information in the second bit field;
a target codebook subset configuration, where the target codebook subset configuration is a codebook subset configuration corresponding to the number of ports of the first SRS resource.

In an optional implementation of the present application, the first bit field is a TPMI and rank field, and the second bit field is an SRI field.

Those skilled in the art should understand that related descriptions of the foregoing device for determining a codebook subset in the embodiments of the present application can be understood with reference to related descriptions of methods for determining a codebook subset in the embodiments of the present application.

Figure 6:
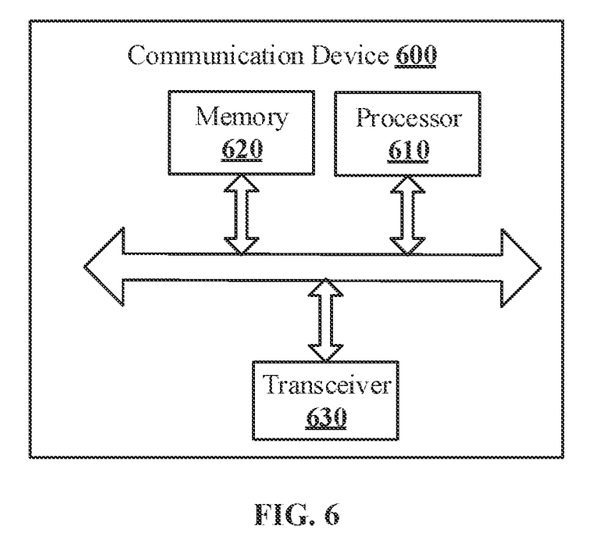
FIG. 6 is a block diagram of a communication device according to an embodiment of the present application.

FIG. 6 is a block diagram of a communication device 600 according to an embodiment of the present application. The communication device may be a user device or a network device. The communication device 600 illustrated in FIG. 6 includes a processor 610. The processor 610 may call and run a computer program from a memory to implement the method in the embodiment of the present application.

Optionally, as illustrated in FIG. 6, the communication device 600 may further include a memory 620. The processor 610 may call and run a computer program from the memory 620 to implement the method in the embodiment of the present application.

The memory 620 may be a separate device independent of the processor 610, or may be integrated in the processor 610.

Optionally, as illustrated in FIG. 6, the communication device 600 may further include a transceiver 630, and the processor 610 may control the transceiver 630 to communicate with other devices, and specifically, may send information or data to other devices, or receive other Information or data sent by the device.

The transceiver 630 may include a transmitter and a receiver. The transceiver 630 may further include antennas, and the number of antennas may be one or more.

Optionally, the communication device 600 may specifically be a network device according to the embodiment of the present application, and the communication device 600 may implement a corresponding process implemented by the network device in each method of the embodiment of the present application. For brevity, details are not described herein again.

Optionally, the communication device 600 may specifically be a mobile terminal user device according to the embodiment of the present application, and the communication device 600 may implement a corresponding process implemented by the mobile terminal user device in each method of the embodiment of the present application. For brevity, details are not described herein again.

Figure 7:
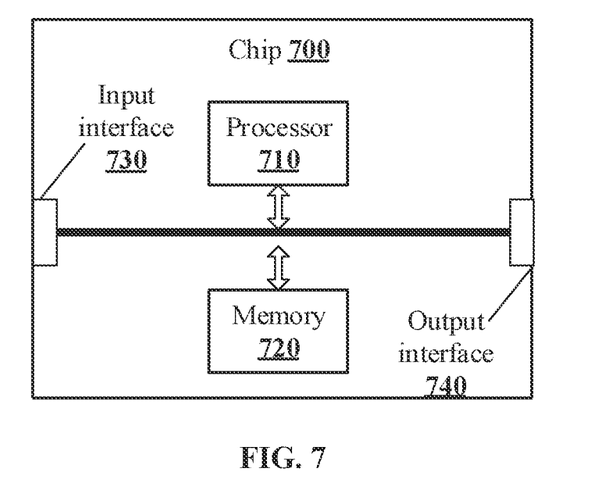
FIG. 7 is a block diagram of a chip according to an embodiment of the present application.

FIG. 7 illustrates a block diagram of a chip according to an embodiment of the disclosure. As illustrated in FIG. 7, the chip 700 includes a processor 710, The processor 710 may call and execute the computer programs in a memory to execute the method in the embodiments of the disclosure.

In at least one embodiment, as illustrated in FIG. 7, the chip 700 may further include a memory 720. The processor 710 may call and execute the computer programs in the memory 720 to execute the method in the embodiments of the disclosure.

The memory 720 may be a separate device from the processor 710, and may also be integrated into the processor 710.

In at least one embodiment, the chip 700 may further include an input interface 730. The processor 710 may control the input interface 730 to communicate with another device or chip. Specifically, the processor 710 may control the input interface 730 to obtain information or data from another device or chip.

In at least one embodiment, the chip 700 may further include an output interface 740. The processor 710 may control the output interface 740 to communicate with another device or chip. Specifically, the processor 710 may control the output interface 740 to send information or data to another device or chip.

In at least one embodiment, the chip may be applied to the network device in the embodiments of the disclosure. The chip may implement a corresponding process implemented by the network device in each method embodiment of the disclosure, which will not be elaborated herein for brief description.

In at least one embodiment, the chip may be applied to the terminal/mobile terminal in the embodiments of the disclosure. The chip may implement a corresponding process implemented by the terminal/mobile terminal in each method embodiment of the disclosure, which will not be elaborated herein for brief description.

It is to be understood that in the embodiments of the disclosure, the chip may also be referred to as a system level chip, a system chip, a chip system or a system-on-chip.

Figure 8:
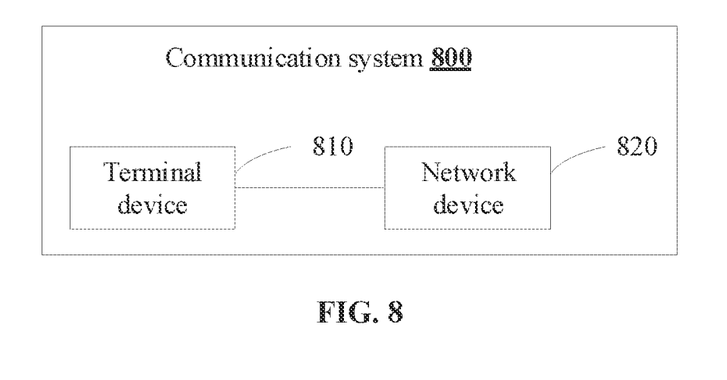
FIG. 8 is a block diagram of a communication system according to an embodiment of the present application.

FIG. 8 illustrates a schematic block diagram of a communication system 800 according to an embodiment of the present disclosure. As illustrated in FIG. 8, the communication system 800 includes a terminal device 810 and a network device 820.

The terminal device 810 may be configured to implement the corresponding function implemented by the terminal device in the above method, and the network device 820 may be configured to implement the corresponding function implemented by the network device in the above method.

It is to be understood that in the embodiments of the disclosure, the processor may be an integrated circuit chip with a signal processing capability. In an implementation process, each operation of the method embodiments may be completed by an integrated logical circuit of hardware in the processor or an indication in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

The embodiments of the disclosure also provide a computer-readable storage medium for storing one or more computer programs.

In at least one embodiment, the computer-readable storage medium may be applied in the network device of the embodiments of the disclosure. The computer programs may enable a processor to perform the corresponding process implemented by the network device in each method embodiment of the disclosure, which will not be elaborated herein for brief description.

In at least one example, the computer-readable storage medium may be applied in the terminal/mobile terminal of the embodiments of the disclosure. The computer programs may enable a processor to perform the corresponding process implemented by the terminal/mobile terminal in each method embodiment of the disclosure, which will not be elaborated herein for brief description.

The embodiments of the disclosure also provide a computer program product. The computer program product includes one or more computer program indications.

In at least one embodiment, the computer program product may be applied in the network device of the embodiments of the disclosure. The computer program indications may enable a processor to perform the corresponding process implemented by the network device in each method embodiment of the disclosure, which will not be elaborated herein for brief description.

In at least one example, the computer program product may be applied in the terminal/mobile terminal of the embodiments of the disclosure. The computer program indications may enable a processor to perform the corresponding process implemented by the terminal/mobile terminal in each method embodiment of the disclosure, which will not be elaborated herein for brief description.

The embodiments of the disclosure also provide a computer program.

In at least one embodiment, the computer program may be applied in the network device of the embodiments of the disclosure. The computer program, when executed by a processor, enables a processor to perform the corresponding process implemented by the network device in each method embodiment of the disclosure, which will not be elaborated herein for brief description.

In at least one example, the computer program may be applied in the terminal/mobile terminal of the embodiments of the disclosure. The computer program, when executed by a processor, enables a processor to perform the corresponding process implemented by the terminal/mobile terminal in each method embodiment of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of indications configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a codebook subset, comprising:
    receiving, by a user equipment (UE), first indication information from a network device, wherein the first indication information is used to indicate a first sounding reference signal (SRS) resource in an SRS resource set; and
    receiving, by the UE, second configuration information from the network device, wherein the second configuration information is used to configure the SRS resource set, the SRS resource set comprises one or a plurality of SRS resources, and the SRS resource set is configured to support full power transmission; and wherein when the SRS resource set comprises the plurality of SRS resources, each of the plurality of SRS resources is configured to have a number of antenna ports as same as or different from that of one another;
    receiving, by the UE, first configuration information from the network device, wherein the first configuration information is used to configure codebook subsets; and
    determining, by the UE, the first SRS resource in the SRS resource set based on the first indication information and the second configuration information; and when the first SRS resource has two antenna ports, determining, by the UE, that the codebook subset for uplink transmission is 'nonCoherent' if the first configuration information is set to 'partialAndNonCoherent'.

2. The method according to claim 1, wherein usage of the SRS resource set is set to 'codebook'.

3. The method according to claim 1, wherein when a maximum number of antenna ports of all SRS resources in the SRS resource set is 2, the UE does not expect the network device to set the first parameter to 'partialAndNonCoherent'.

4. The method according to claim 1, further comprising:
    sending, by the UE, second indication information to the network device, wherein the second indication information is used to indicate that when 2 antenna ports are used for uplink transmission, the UE supports the codebook subset for uplink transmission.

5. The method according to claim 4, wherein the second indication information is carried in a capability report of the UE.

6. The method according to claim 1, wherein the first configuration information includes a plurality of configuration parameters, and different configuration parameters in the plurality of configuration parameters are used to determine codebook subset configurations corresponding to different antenna ports.

7. The method according to claim 6, wherein the plurality of configuration parameters include a first configuration parameter and a second configuration parameter, the first configuration parameter is used to determine a first codebook subset configuration corresponding to 4 antenna ports, and the second configuration parameter is used to determine a second codebook subset configuration corresponding to 2 antenna ports.

8. The method according to claim 7, wherein determining, by the UE, the codebook subset for uplink transmission based on the first indication information and the first configuration information, comprising:
    determining, by the UE, a first SRS resource in the SRS resource set based on the first indication information and the second configuration information; and when the first SRS resource has 2 antenna ports, determining, by the UE, the codebook subset for uplink transmission based on the second codebook subset configuration; or, when the first SRS resource has 4 antenna ports, determining, by the UE, the codebook subset for uplink transmission based on the first codebook subset configuration.

9. The method according to claim 1, further comprising:
receiving, by the UE, downlink control information (DCI), wherein the DCI is used to schedule the uplink transmission, the DCI includes a first bit field and a second bit field; the first bit field is used to carry third indication information, the third indication information is used to indicate information of a precoder and a transmission rank, the second bit field is used to carry the first indication information, and the first indication information is used to indicate the first SRS resource in the SRS resource set;
wherein a size of the first bit field is determined based on at least one of the following:
a value of the second bit field;
a number of ports of the first SRS resource, where the first SRS resource is indicated by the first indication information in the second bit field; or
a target codebook subset configuration, wherein the target codebook subset configuration is a codebook subset configuration corresponding to the number of ports of the first SRS resource.

10. The method according to claim 9, wherein the first bit field is a transmit precoding matrix indicator (TPMI) and rank field, and the second bit field is an SRS resource indicator (SRI) field.

11. A user equipment (UE), comprising:
a transceiver, configured to receive first indication information from a network device and receive first configuration information from the network device, wherein the first indication information is used to indicate a first SRS resource in an SRS resource set; and the first configuration information is used to configure codebook subsets; and wherein the transceiver is further configured to receive second configuration information from the network device, the second configuration information is used to configure the SRS resource set, the SRS resource set comprises one or a plurality of SRS resources, and the SRS resource set is configured to support full power transmission; when the SRS resource set includes the plurality of SRS resources, each of the plurality of SRS resources is configured to have a number of antenna ports as same as or different from that of one another; and
a processor, configured to determine the first SRS resource in the SRS resource set based on the first indication information and the second configuration information; and when the first SRS resource has two antenna ports, the processor is configured to determine that the codebook subset used for uplink transmission is 'nonCoherent' if the first configuration information is set to 'partialAndNonCoherent'.

12. The UE according to claim 11, wherein usage of the SRS resource set is set to codebook.

13. The UE according to claim 11, wherein when a maximum number of antenna ports of all SRS resources in the SRS resource set is 2, the UE does not expect the network device to set the first parameter to 'partialAndNonCoherent'.

14. The UE according to claim 11, wherein the transceiver is further configured to send second indication information to the network device, wherein the second indication information is used to indicate that when 2 antenna ports are used for uplink transmission, the UE supports the codebook subset for uplink transmission.

15. The UE according to claim 14, wherein the second indication information is carried in a capability report of the UE.

16. The UE according to claim 11, wherein the first configuration information includes a plurality of configuration parameters, and different configuration parameters in the plurality of configuration parameters are used to determine codebook subset configurations corresponding to different antenna ports.

17. The UE according to claim 16, wherein the plurality of configuration parameters include a first configuration parameter and a second configuration parameter, the first configuration parameter is used to determine a first codebook subset configuration corresponding to 4 antenna ports, and the second configuration parameter is used to determine a second codebook subset configuration corresponding to 2 antenna ports.

18. The UE according to claim 17, wherein the processor is further configured to determine a first SRS resource in the SRS resource set based on the first indication information and the second configuration information; and
when the first SRS resource has 2 antenna ports, the processor is configured to determine the codebook subset for uplink transmission based on the second codebook subset configuration; or,
when the first SRS resource has 4 antenna ports, the processor is configured to determine the codebook subset for uplink transmission based on the first codebook subset configuration.

19. The UE according to claim 11, wherein the transceiver is further configured to receive downlink control information (DCI), wherein the DCI is used to schedule the uplink transmission, the DCI includes a first bit field and a second bit field; the first bit field is used to carry third indication information, the third indication information is used to indicate information of a precoder and a transmission rank, the second bit field is used to carry the first indication information, and the first indication information is used to indicate the first SRS resource in the SRS resource set;
wherein a size of the first bit field is determined based on at least one of the following:
a value of the second bit field;
a number of ports of the first SRS resource, where the first SRS resource is indicated by the first indication information in the second bit field; or
a target codebook subset configuration, wherein the target codebook subset configuration is a codebook subset configuration corresponding to the number of ports of the first SRS resource.

20. A user equipment (UE), comprising:
a transceiver, configured to receive first indication information from a network device and receive first configuration information from the network device, wherein the first indication information is used to indicate a first SRS resource in an SRS resource set; and the first configuration information is used to configure codebook subsets; and wherein the transceiver is further configured to receive second configuration information from the network device, the second configuration information is used to configure the SRS resource set, the SRS resource set comprises one or a plurality of SRS resources, and the SRS resource set is configured to support full power transmission; when the SRS resource set includes the plurality of SRS resources, each of the plurality of SRS resources is configured to have a number of antenna ports as same as or different from that of one another; and a processor, configured to determine the first SRS resource in the SRS resource set based on the first indication information and the second configuration information; and wherein when the first SRS resource has two antenna ports, the processor is configured to determine that the codebook subset used for uplink transmission is 'fully AndPartialAndNonCoherent' if the first configuration information is set to 'partialAndNonCoherent'.

* * * * *